United States Patent [19]
Bodie et al.

[11] Patent Number: 5,707,115
[45] Date of Patent: Jan. 13, 1998

[54] REGENERATIVE BRAKING METHOD

[75] Inventors: Mark Olen Bodie, Dayton; Kamal Naif Majeed, Centerville, both of Ohio

[73] Assignee: General Motors Corporation, Detroit, Mich.

[21] Appl. No.: 723,442

[22] Filed: Oct. 7, 1996

[51] Int. Cl.$^6$ ........................................... B60T 13/74
[52] U.S. Cl. .......................... 303/3; 188/156; 188/158; 303/152; 180/165
[58] Field of Search ..................... 303/3, 152, 186, 303/112, 166, 9.62, 169, 113.5, 188; 188/158, 156, 181 T; 180/165, 65.1; 364/426.01, 424.026, 426.015

[56] References Cited

U.S. PATENT DOCUMENTS

| | | | |
|---|---|---|---|
| 4,671,577 | 6/1987 | Woods | 303/3 |
| 4,962,969 | 10/1990 | Davis | 303/3 |
| 5,318,355 | 6/1994 | Asanuma et al. | 303/3 |
| 5,362,135 | 11/1994 | Riddiford et al. | 303/3 |
| 5,399,000 | 3/1995 | Aoki et al. | 188/156 |
| 5,492,192 | 2/1996 | Brooks et al. | 180/165 |
| 5,568,962 | 10/1996 | Enomoto et al. | 303/152 |

*Primary Examiner*—Douglas C. Butler
*Attorney, Agent, or Firm*—Anthony Luke Simon

[57] ABSTRACT

In a vehicle with a first set of first and second wheels coupled to an electric drive system capable of providing regenerative braking and a second set of third and fourth wheels, wherein the vehicle dynamically adjusts a brake proportioning between the first and second sets responsive to a determined wheel speed difference between the first and second sets, the improvement comprising a regenerative braking control method according to the steps of: measuring first, second, third and fourth speeds of the first, second, third and fourth wheels; for each wheel of one of the first and second sets, determining a set-off value inversely relational to a commanded brake torque and a wheel deceleration; determining modified wheel speeds for each wheel of said one of the first and second sets responsive to the wheel speeds and the set-off values; and determining the wheel speed difference between the first and second sets responsive to the modified wheels speeds of said one of the first and second sets and the wheel speeds of the other of the first and second sets, wherein the dynamic adjusting of brake proportioning between the first and second sets increases brake torque load on the first and second wheels, increasing an amount of braking achieved regeneratively.

3 Claims, 5 Drawing Sheets

REGENERATIVE BRAKING METHOD

This invention relates to a regenerative braking method.

BACKGROUND OF THE INVENTION

Many vehicles with electric propulsion systems utilize regenerative braking to recover energy during braking by forcing the electric propulsion system to act as a generator and providing the generated electric power to a storage system such as the vehicle batteries. During such power generation, the propulsion system outputs braking torque and transfers it to the vehicle wheels to slow the vehicle.

SUMMARY OF THE PRESENT INVENTION

It is an object of this invention to provide a regenerative braking method according to Claim 1.

Advantageously, this invention provides a regenerative braking method that provides improved energy recovery by increasing the braking load of the regenerative braking system and correspondingly decreasing the braking load on the friction braking system.

Advantageously, this invention improves the energy recovery from regenerative braking by deviating from ideal front-to-rear brake proportioning during certain driving conditions, transferring more braking torque to the wheels coupled to the electric drive system.

Advantageously, this invention transitions from non-ideal front-to-rear brake proportioning to ideal front-to-rear brake proportioning as vehicle requested brake torque increase and as individual wheel deceleration increases.

Advantageously this invention implements the regenerative brake control with improved energy recovery into a control providing closed loop wheel speed based front-to-rear dynamic brake proportioning.

The advantages described herein are provided in a preferred example in a vehicle with a first set of first and second wheels coupled to an electric drive system capable of providing regenerative braking and a second set of third and fourth wheels, wherein the vehicle dynamically adjusts a brake proportioning between the first and second sets responsive to a determined wheel speed difference between the first and second sets, the improvement comprising a regenerative braking control method according to the steps of: measuring first, second, third and fourth speeds of the first, second, third and fourth wheels; for each wheel of one of the first and second sets, determining a set-off value inversely relational to a commanded brake torque and a wheel deceleration; determining modified wheel speeds for each wheel of said one of the first and second sets responsive to the wheel speeds and the set-off values; and determining the wheel speed difference between the first and second sets responsive to the modified wheels speeds of said one of the first and second sets and the wheel speeds of the other of the first and second sets, wherein the dynamic adjusting of brake proportioning between the first and second sets increases brake torque load on the first and second wheels, increasing an amount of braking achieved regeneratively.

BRIEF DESCRIPTION OF THE DRAWINGS

The present invention will now be described by way of example with reference to the following drawings in which.

DETAILED DESCRIPTION OF THE INVENTION

Figure 1:
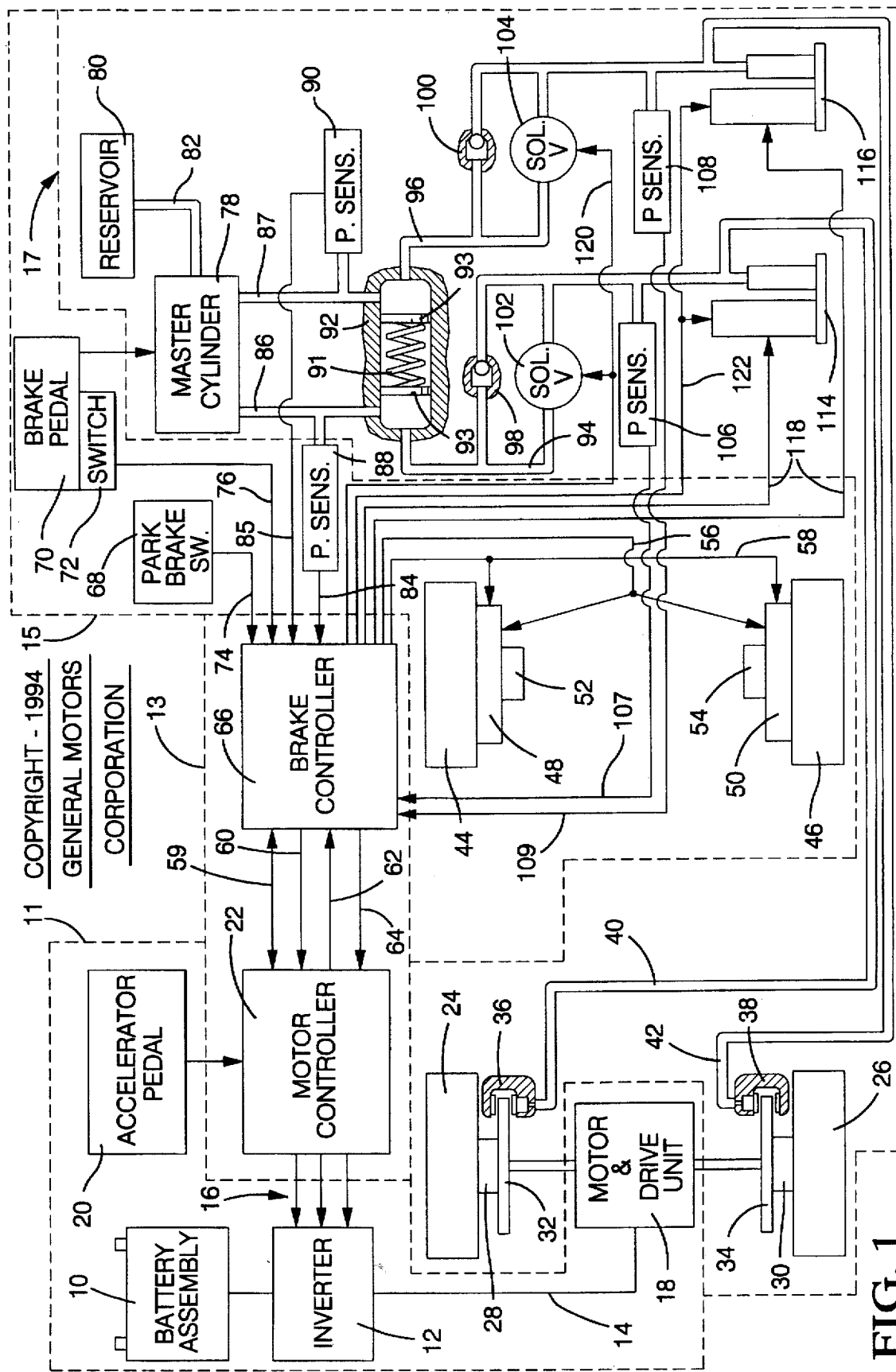
FIG. 1 illustrates an example apparatus for implementing the method according to this invention.

Referring to FIG. 1, an electric vehicle according to this invention comprises electric motor propulsion system 11, brake system 15 and control unit 13. The electric motor propulsion system 11 includes battery pack 10, inverter 12 (for use with AC motors), accelerator pedal 20 and electric motor and drive train 18. Brake system 15 includes brake pedal 70, hydraulic braking system 17 and electric drum brakes 48 and 50. Control unit 13 includes motor controller 22 for controlling the propulsion system 11 and brake controller 66 for controlling brake system 15.

In the propulsion system 11, battery pack 10 supplies power to the vehicle systems and power inverter 12 responds to motor controller 22 for controlling electric motor 18. Motor 18 provides both drive force to vehicle drive wheels 24 and 26 and regenerative braking by generating power, when commanded, and coupling the generated power to battery pack 10, resulting in braking torque to wheels 24 and 26. An example motor drive and recharge system, suitable for use as inverter 12 and motor 18 (assuming a three phase AC motor 18 is used), is set forth in U.S. Pat. No. 5,099,186, assigned to the assignee of this invention and having a disclosure that is incorporated herein by reference.

Accelerator pedal 20 provides an accelerator command to motor controller 22, which responsively controls inverter 12 via command line 16 to provide power to motor 18 and thereby provide motive drive force to drive wheels 24 and 26.

In brake system 15, hydraulic brake system 17 comprises master cylinder 78, hydraulic lines 40, 42, 86, 87, 94 and 96, accumulator 92, actuators 114 and 116, solenoid valves 102 and 104, brake calipers 36 and 38 and brake discs 32 and 34. Brake controller 66 responds to operator depression of brake pedal 70, providing brake information to motor controller 22 and controlling the hydraulic brake system, including solenoid valves 102 and 104, actuators 114 and 116, and electric rear brakes 48 and 50. Bypass valves 98 and 100 allow excess pressure from actuators 114 and 116 to flow to accumulator 92. Brake controller 66 also monitors the various rotational speeds of vehicle wheels 24, 26, 44 and 46 through speed sensors 28, 30, 52 and 54.

The battery pack 10 can be any battery pack or rechargeable electric power storage device suitable for use in an electric vehicle. Power inverter 12 is used when motor 18 is one or more AC motors. If one or more DC drive motors are used, power inverter 12 is not necessary and may be replaced with an appropriate DC motor controller of a type well known to those skilled in the art.

The motor drive unit 18 may be a single drive motor driving both wheels 24 and 26, may be two motors connected back-to-back driving wheels 24 and 26, or may be two or more motors with each motor incorporated into each wheel assembly. Additionally, the motors may be AC motors or DC motors, including one or more brushless DC motors. The drive train preferably comprises a reduction gear set coupled to the motor output shaft and driving the vehicle drive wheels. No clutches are necessary in the drive train as adequate performance has been achieved without the necessity of a gear shifting transmission and since, to reverse the vehicle, the motor direction may simply be reversed. Reduction gear sets of the type suitable for use in the drive train are well known to those skilled in the art.

The motor controller 22 may be any microcomputer based controller suitable for providing control commands to the type of motor used. Accelerator pedal 20 responds to operator foot commands in a conventional manner, providing output signals through an actuator for converting pedal position to an electric signal. Preferably, the actuator comprises redundant potentiometers that provide two or more pedal position signals to motor controller 22. This type of accelerator pedal may be easily implemented by those skilled in the art.

Brake controller 66 may be any microprocessor based controller suitable for providing output commands to actuators 114 and 116, rear brakes 48 and 50 and valves 102 and 104 and for receiving input signals from the parking brake switch 68, brake pedal switch 72 and pressure transducers 88, 90, 106 and 108.

The brake pedal 70 may be a conventional brake pedal and switch 72 may be a conventional brake pedal switch of a known type commonly used to turn on rear brake lights (not shown). The master cylinder 78 is a conventional master cylinder with a reservoir 80 connected by hydraulic line 82. The accumulator 92 has expansion chambers on each side allowing accumulation of hydraulic fluid by compression of center spring 91 between two pistons 93. Pressure transducers 88 and 90 may be any suitable type of transducers for providing signals indicative of the pressure in brake lines 86 and 87. Valves 102 and 104 are solenoid valves normally opened and being controllable to isolate hydraulic lines 94 and 96 from lines 40 and 42, respectively, when a command is received through command line 120.

Actuators 114 and 116 may be existing anti-lock brake actuators with the requirement that the actuators be capable to independently provide pressure in hydraulic lines 40 and 42 responsive to commands on line 118. Actuators 114 and 116 are of the type set forth in U.S. Pat. Nos. 4,850,650 and Re. 33,663, both assigned to the assignee of this invention and both having disclosures that are incorporated herein by reference.

Brake calipers 36 and 38 are conventional hydraulic disc brake calipers for use with conventional brake discs 32 and 34. An example of the front brake system is set forth in U.S. Pat. No. 5,246,283, assigned to the assignee of this invention, and having a disclosure that is incorporated herein by reference.

Electric brakes 48 and 50 for rear wheels 44 and 46 may be any suitable electric brake. Example electric drum brakes are set forth in U.S. Pat. Nos. 5,000,297, 5,024,299, 5,310,026 and 5,219,049, each assigned to the assignee of this invention and having a disclosure that is incorporated herein by reference.

Speed sensors 28, 30, 52 and 54 are well known to those skilled in the art and may be of the type commonly used in anti-lock brake systems.

The operation of the electric vehicle according to this invention will be described with reference to the following example OPERATING CONDITIONS.

OPERATING CONDITION 1

Assume that accelerator pedal 20 is depressed and brake pedal 70 is not depressed. Routinely, motor controller 22 receives the signal from the brake controller 66 indicating amount of depression, if any, of brake pedal 70. Since, in this operating condition, the brake pedal is not depressed, no brake signal is received.

Accelerator pedal 20 provides a signal to motor controller 22, which responsively develops an acceleration torque command proportional to the amount of operator depression of accelerator pedal 20. Motor controller 22 outputs a command through command lines 16 to inverter 12 responsive to the acceleration torque command. Inverter 12 then provides power to motor 18 from battery pack 10, commanding an output torque for motor 18 responsive to the amount of depression of accelerator pedal 20.

OPERATING CONDITION 2

Assume that accelerator pedal 20 is not depressed and that brake pedal 70 is depressed. When brake pedal 70 is depressed, master cylinder 78 provides hydraulic pressure in hydraulic lines 86 and 87 proportional to the amount of pressure placed on the brake pedal by the foot of the vehicle operator. A brake switch 72 provides a signal through line 76 to brake controller 66 indicating that brake pedal 70 has been depressed. In response to the signal indicating that brake pedal 70 has been depressed, solenoid valves 102 and 104 are commanded via line 120 to close, isolating hydraulic lines 94 and 96 from hydraulic lines 40 and 42. The pressure signals on lines 84 and 85 from pressure transducers 88 and 90 indicate the amount of pressure in hydraulic lines 86 and 87, which is a measure of the pressure applied to the brake pedal 70.

Accumulator 92 has two expandable chambers that expand when fluid pressure on pistons 93 forces center spring 91 to compress. This allows the brake pedal to be depressed in a normal manner when more pressure is applied to the brake pedal, despite the closing of solenoid valves 102 and 104. Without accumulator 92, when solenoid valves 102 and 104 close, travel of the brake pedal 70 would be substantially halted.

Brake controller 66 converts the brake pedal pressure signals on lines 84 and 85 to a brake torque command and provides a request on line 60 to motor controller 22 for regenerative braking. Motor controller 22 continuously runs a routine (i.e., every 100 ms) to determine the amount of regenerative braking capable by monitoring rotational speed of motor 18 and by monitoring the condition of battery pack assembly 10, including the voltage level and current flow. The amount of regenerative braking capable is determined by the amount of power that can be generated by motor 18 at its given rotational speed. The determined amount of regenerative braking capable may be limited by other factors, such as battery voltage conditions, which indicate the amount of power that can be transferred to battery pack 10 without harming the electrical system or battery pack 10, and vehicle speed.

Motor controller 22 then, responsive to the brake regeneration request and the determined regeneration capability, commands power inverter 12 through line 16 to place motor 18 in a regenerative state and transfer energy to battery pack 10. The regenerative state of motor 18 provides braking torque to the vehicle wheels to which motor 18 is connected at a level corresponding to either (a) the determined regenerative braking capability, or (b) the brake torque command, whichever is less.

Motor controller 22 also provides a command on line 62 to brake controller 66 indicating the amount of regenerative brake torque commanded (and assumed to be achieved when open loop control is used). The actual function in the motor controller is to subtract the acceleration torque command from the regenerative brake torque command. However, in this operating condition, the acceleration torque command is zero since the accelerator pedal is not depressed.

Brake controller 66 subtracts the regenerative brake torque achieved from the brake command to determine a torque difference command. Brake controller 66 then outputs the torque difference command through lines 118 to actuators 114 and 116. Actuators 114 and 116 responsively apply pressure to hydraulic lines 40 and 42 proportional to the torque difference command. The hydraulic pressure in lines 40 and 42 responsively forces brake calipers 36 and 38 to apply friction braking to front brake discs 32 and 34 responsive to the torque difference command. Closed loop control of brake pressure applied to the front brakes is monitored via pressure transducers 106 and 108, providing signals to brake controller 66 via lines 107 and 109. Note, if all of the requested braking torque is achieved by the motor regeneration, then no friction braking is applied to the front brakes.

According to the above description, the total front braking torque is the sum of the regenerative brake torque achieved and the friction brake torque achieved. The distribution of front braking torque between regenerative braking and friction braking is constantly varied responsive to the determined amount of regenerative braking achievable.

Brake controllers 66 also controls rear electric brakes 48 and 50 via line 58. The rear electric brake command is determined as a function of the input brake pressure signal and vehicle speed to provide standard front-rear brake proportioning applicable to all vehicles. The front-rear proportioning is then modified, in certain driving conditions, to a non-ideal front-rear brake proportioning to increase the amount of braking done regeneratively, increasing the amount of energy recovery during braking and increasing the efficiency of the vehicle. This is explained in more detail further below.

OPERATING CONDITION 3

Assume that both brake pedal 70 and accelerator pedal 20 are depressed, with depression of accelerator pedal 20 commanding more acceleration torque than depression of brake pedal 70 is commanding brake torque. When brake pedal 70 and accelerator pedal 20 are both depressed, the electric vehicle could drive both the motor 18 and the front brakes 32, 34. Driving both systems at the same time, however, requires an expense of power because power is provided both to the motor and the brakes to provide torque in competing directions. Thus, while the power input to the two systems has a magnitude equal to the sum of the magnitudes of the power provided to each system, the motive torque (vehicle speed acceleration or braking) achieved is the difference of the magnitudes of the torque commanded to each system.

The acceleration torque commands and brake torque commands are not blindly applied to the motor and brake systems to generate competing output torques. Instead, the brake torque command determined by brake controller 66 is provided to motor controller 22, which sums the brake torque command and accelerator torque command. (Note: the brake torque command is always negative since brake torque is always commanded in the opposite direction of acceleration torque). If the sum of the brake torque command and the acceleration torque command is positive, which occurs in this example, more acceleration torque is commanded than brake torque is commanded. A command proportional to the resultant sum is provided via line 16 to power inverter 12, which commands motor 18 to provide an output torque equal to the magnitude of acceleration torque minus the magnitude of brake torque.

The command line 62 provides a signal to line 66 indicating the amount of braking torque achieved according to the equation commanded torque minus the acceleration torque command, which in this operating condition, indicates that all braking torque is accounted for in the above torque summation. Responsively, brake controller 66 does not drive the vehicle front brake units. As a design option, the rear brakes may be driven responsive to only the brake pedal signal. Thus while the front brakes are not allowed to compete with the front wheel drive motor 18, the electric rear brakes are. Alternatively, the rear electric brakes may be inhibited when the sum of the acceleration torque and braking torque commands is positive. In this manner, competing vehicle systems do not fight each other and expend energy unnecessarily when both the accelerator pedal and brake pedal are depressed.

OPERATING CONDITION 4

Assume that both accelerator pedal 20 and brake pedal 70 are depressed, with brake pedal 70 commanding more brake torque than accelerator pedal 20 is commanding acceleration torque. Again the brake torque command is provided from brake controller 66 through line 60 to motor controller 22, which sums the accelerator torque command and the brake torque command. In this operating condition, the magnitude of the brake torque command is greater than the magnitude of the accelerator torque command and the resultant sum is negative, indicating that the sum of the commands requires braking. The motor controller 22 then determines the amount of regeneration braking available and applies the a regenerative braking command to inverter 12 responsive to the minimum of (i) the sum of the torque commands and (ii) the regenerative braking torque available. In response, inverter 12 controls motor 18 to provide regenerative braking by generating power and transferring the power to battery pack 10.

The difference between the motor torque command (the regenerative braking command) and the acceleration torque command is determined as the torque achieved signal and provided through line 62 to brake controller 66. Brake controller 66 subtracts from the brake torque command the torque achieved signal to determine the torque difference signal. If the brake difference signal is less than zero (note: all brake torque commands are negative), which is the case of this operating condition, then brake actuators 114 and 116 are activated providing hydraulic brake pressure in hydraulic brake lines 40 and 42 commanding braking from disc brakes 32 and 34 at a torque equal to the torque difference signal. The rear brakes 48 and 50, as described above, are commanded as a function of the brake pedal pressure.

In the above operating examples where braking is applied, a vehicle operator who is a one-footed driver (i.e., controls both the accelerator and brake pedals with one foot) depresses the brake pedal and the vehicle braking response has a similar feel to the operator as conventional hydraulic braking of the type used in internal combustion engine vehicles. While the vehicle operator "feels" conventional braking, the vehicle controls described above proportion braking between regenerative braking, in which brake torque is achieved by causing motor 18 to generate power and provide the power to battery pack 10, and friction braking in which the vehicle disc brakes are activated. The electric vehicle continuously changes the proportioning responsive to the vehicle conditions while the vehicle driver feels braking of the vehicle in a manner to which all drivers are accustomed. Further, the two footed driver does not cause the unnecessary consumption of energy that would occur if a drive wheel were driven by the motor while also being braked by the brake. The electric vehicle sums both the brake and the accelerator torque commands and controls the vehicle in response to the sum of the requested torque commands and, when the sum requires braking, blends the regenerative and friction braking.

CONTROL DESCRIPTION

Figure 2:
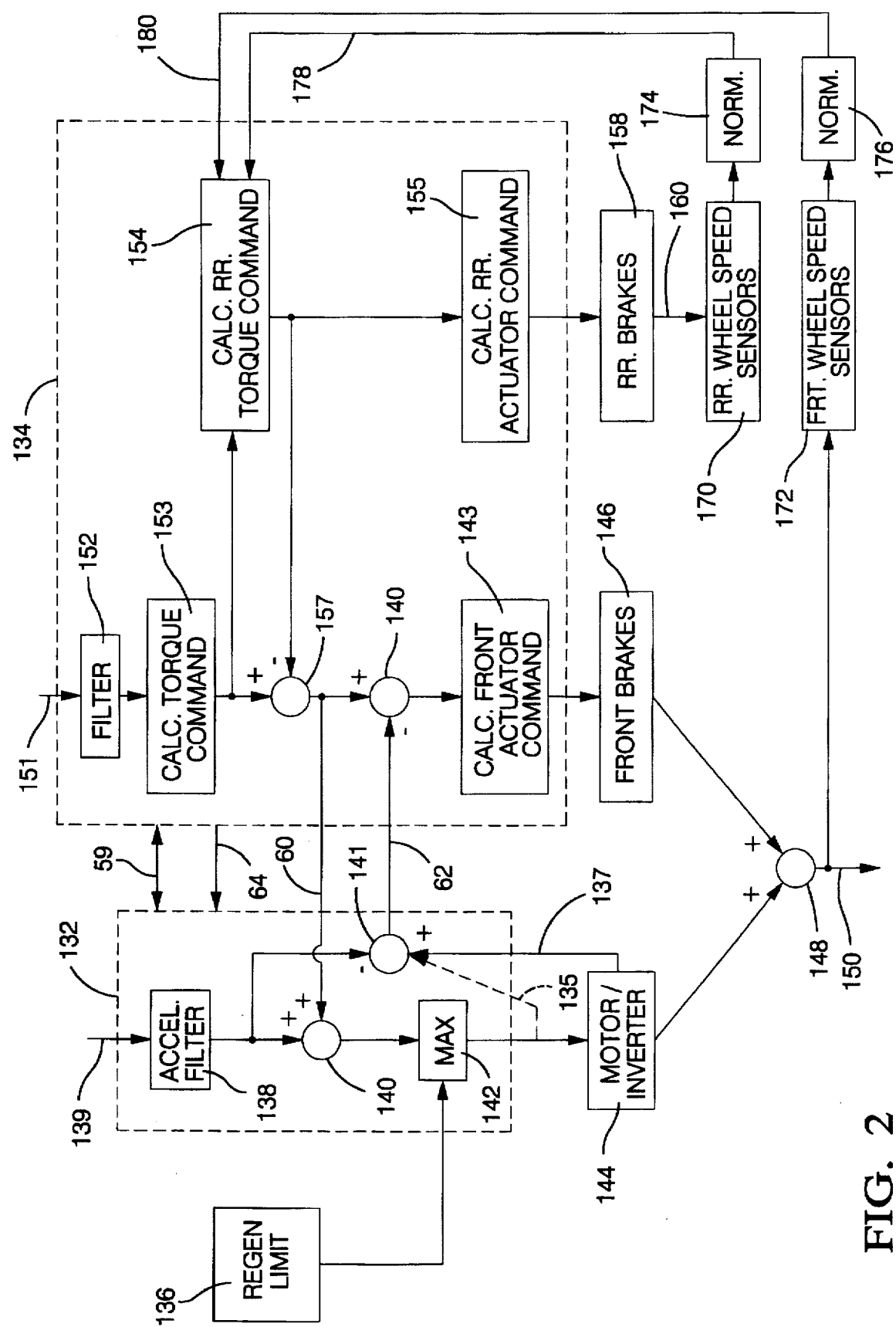
FIG. 2 illustrates an example control according to this invention.

Referring now to FIG. 2, the control architecture according to this invention comprises propulsion control 132 and brake control 134. Regeneration capability is continuously updated at block 136 in response to the rotational speed of the drive motor.

Propulsion control 132 receives an input represented by line 139 from the accelerator pedal, runs the accelerator pedal input through a low-pass filter 138 to filter out noise and provides the filtered signal as an acceleration torque command to summation block 140 and to summation block 141. A conversion function may be implemented, in the form of a multiplication constant or a look-up table, to convert the actual signal from the accelerator pedal to an acceleration torque command.

Summation block 140 adds the acceleration torque command to the front brake torque command received through line 60, the sum of which is the total torque request that is provided to block 142. When the torque request is positive, indicating that the motor is commanded to provide drive force to the wheels, block 142 limits the command to the maximum limit motor torque request. The resultant torque request command is provided to the motor inverter system 144, which provides motive force to the vehicle front wheels, represented via block 148.

When the torque request is negative, indicating regenerative braking is desired, block 142 limits the regenerative braking to the limit that is determined by block 136, and further in response to battery voltage and, if desired, vehicle speed. The output of block 142 commands the motor inverter system to act as a generator causing regenerative braking to the vehicle front wheels represented as summation block 148.

As an optional implementation, line 137 can be implemented as feedback for motor inverter system 144 to provide feedback as to the actual amount of regenerative braking achieved. This is not necessary as open loop systems have been found to provide high levels of performance. In the open loop implementation, feedback of the motor commands 135 is provided, coupling the output of limiting block 142 to summation block 141. Summation block 141 subtracts the acceleration torque command from the resultant torque request to determine a torque achieved signal and provides the torque achieved signal to brake control 134 via line 62.

A serial data link 59 may be implemented to provide updates to braking subsystem 134 of regeneration limits, as computed by block 136.

Brake control 134 receives an input represented by line 151 from the brake pedal, runs the brake pedal input through a low-pass filter 152 to filter out noise and provides the filtered signal to block 153, which converts the signal, using a multiplication constant, to a brake torque command. The brake torque command is provided to block 154, which determines the rear brake torque command as a function of the brake torque command. Block 154 is responsive to the front and rear wheel speed sensors, represented by blocks 172 and 170, respectively, whose outputs are normalized at blocks 174 and 176, with the normalized wheel speeds provided to block 154 via lines 178 and 180.

The normalization of the rear wheel speeds at block 174 is carried out in the manner described in pending United States patent application, Ser. No. 08/513,192, assigned to the assignee of this invention.

Figure 3:
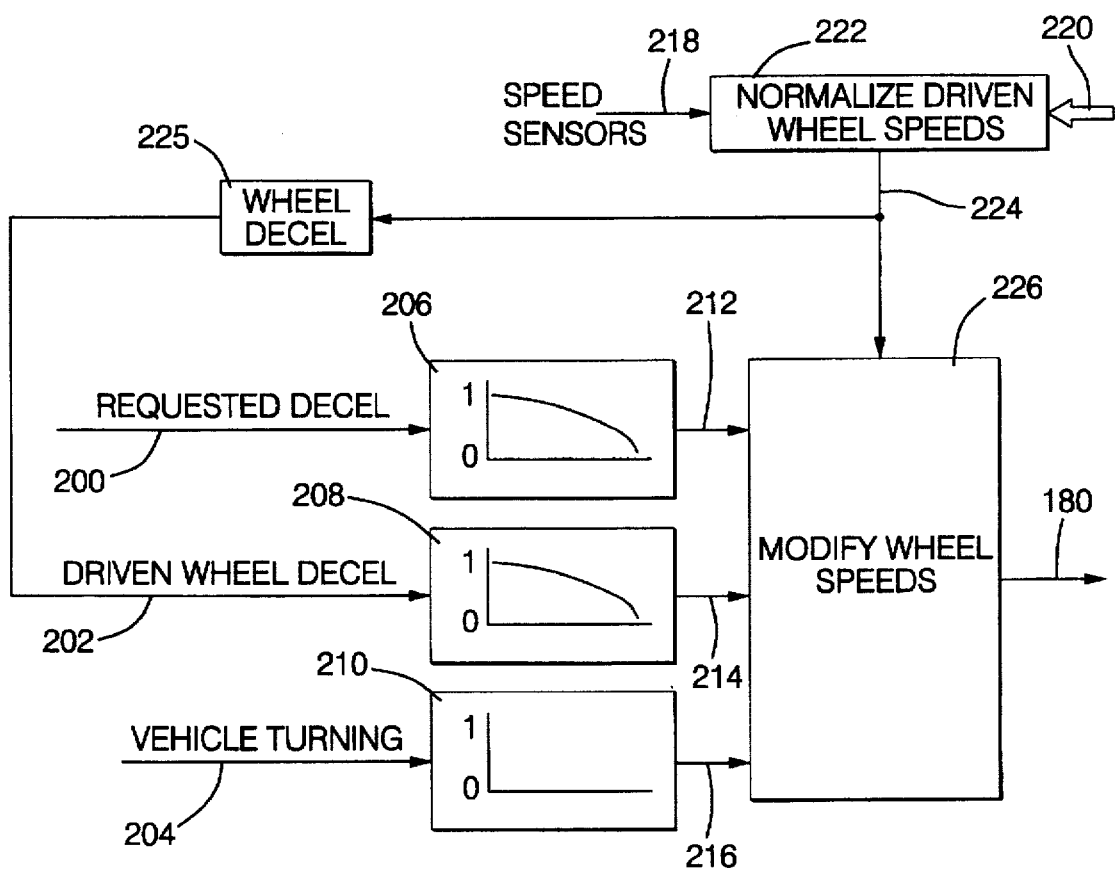
FIG. 3 illustrates an example control implementation of block 176 of FIG. 2.

The normalization of the front wheel speeds at block 176 is achieved in an example according to this invention through the control illustrated in FIG. 3. The following control description is done for each of the front wheels. The signal on line 218 from the front wheel speed sensors is first normalized at block 222 in the manner described in the above-mentioned pending application Ser. No. 08/513,192 now U.S. Pat. No. 5,646,848.

The resultant normalized signal on line 224 is provided to block 226 where the normalized wheel speed signal are further modified according to this invention responsive to the brake torque command output from block 153 (FIG. 2), the computed deceleration of the front wheel whose signal is being processed, and the steering state of the vehicle. The wheel deceleration is determined at block 225 in a known manner, for example as the difference in speed of the wheel over a predetermined period.

The steering state is divided into two possibilities, that the vehicle is steered straight and that the vehicle is turning. The steering state can be determined in any number of ways, such as from a steering wheel position sensor, from a lateral accelerometer, from a yaw rate sensor or from a difference in normalized right and left rear (non-driven) wheel speeds. The turning state is used as a discriminating function, when the vehicle is turning, no further modifications to the normalized wheel speed signal on line 224 is made at block 226. When the vehicle is steered straight, the wheel speed signal on line 224 is modified at block 226 so that when the brake torque command is calculated at block 154, less torque is placed on the non-driven wheel brakes, shifting greater brake torque to the driven wheels, which brake torque can be achieved by regenerative braking. This increases the energy recovery of the regenerative braking system.

More specifically, the requested deceleration on line 200 is provided to block 206, which implements a look-up table function providing an output value on line 212 between zero and one. For small requested decelerations, the output value on line 212 is one. As the requested deceleration increases, the output value decreases, reaching zero for brake toque requests above a predetermined threshold, abmax, i.e., 0.3 g.

The driven wheel deceleration on line 202 is provided to block 208, which implements a look-up table function providing an output on line 214 between zero and one. For small wheel deceleration values on line 202 decelerations, the output value on line 214 is one. As the wheel deceleration values increase, the output value decreases, reaching zero for wheel decelerations above a predetermined threshold, awmax, i.e., 0.3 g.

Block 210 implements the vehicle turning discriminator, providing an output value on line 216 equal to one if the steering wheel position signal on line 204 indicates that the vehicle is not turning and equal to zero if the signal on line 204 indicates that the vehicle is turning.

The signals on lines 212, 214 and 216 are provided to block 226 which responsively determines a set-off value and adds that set-off value to the normalized wheel speed signal on line 224 to determine the modified wheel speed, $\omega_m$, for each wheel. More particularly, each modified wheel speed $\omega_m$ is determined as:

$$\omega_m = \omega_n + Krd*Kwd*Kvt*v_s*\Delta s,$$

where $\omega_n$ is the normalized wheel speed signal on line 224, Krd is the signal on line 212 determined by look-up table function block 206, Kwd is the signal on line 214 determined by the look-up table function block 208, Kvt is the signal on line 216, either a zero or a one, as determined by block 210, $v_s$ is the vehicle speed and $\Delta s$ is the maximum slip percentage between the driven and non-driven wheels. The value $\Delta s$ is set to be, for example, 5%. The quantity (Krd*Kwd*Kvt*$v_s$*$\Delta s$) is referred to herein as the set-off value and, as shown by the function blocks 206, 208, is inversely relational to commanded brake torque and wheel deceleration. That is, as brake torque or wheel deceleration increase, the set-off value decreases.

The modified normalized wheel speed signal $\omega_m$ is provided on line 180 to block 154 (FIG. 2). Block 154 uses the normalized wheel speed signals on line 178 and the modified normalized wheel speed signals on line 180 to implement a dynamic proportioning of the front to rear brakes. The dynamic proportioning keeps the total brake torque of the vehicle to the level requested by the driver (taking into account acceleration requested by the two-footed driver as explained above) while proportioning between the front and rear wheels is varied to minimize the error between the front and rear wheel speeds.

The modification at block 226 allows the error between the front and rear wheel speeds to be larger when the requested deceleration and the driven wheel deceleration are below maximum thresholds and the vehicle is not turning. In such conditions, the slip between front and rear wheels can be greater than in hard braking or turning conditions. This allows a higher brake load to be borne by the driven wheels, which can implement the load through regenerative braking, increasing the energy recovery by the regenerative braking system.

Figure 4:
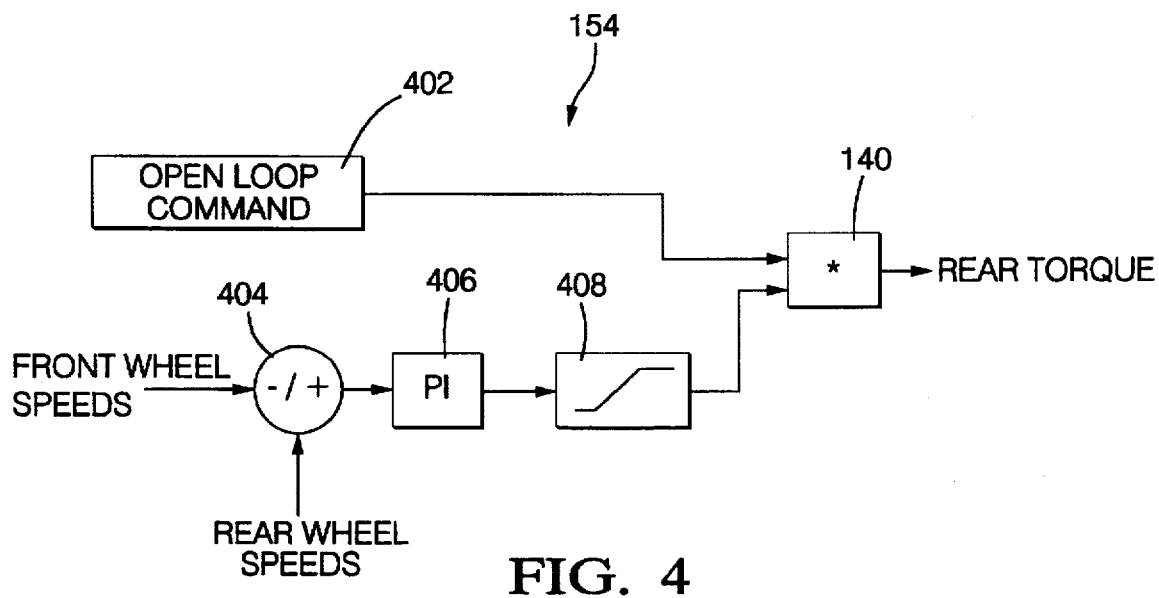
FIG. 4 illustrates an example control implementation of block 154 of FIG. 2.

The block 154 can be implemented as shown in FIG. 4. At block 402, an open-loop rear brake torque command is determined with a look-up table responsive to the output of block 153, using a conventional front-to-rear proportioning function. The open-loop rear brake torque is then modified by the value determined at blocks 404–408. Block 404 determines the value DELTA as follows:

$$DELTA = (\omega_{nlr} + \omega_{nrr}) - (\omega_{mlf} + \omega_{mrf}),$$

where $\omega_{mlf}$ is the modified normalized left front wheel speed determined at block 176, $\omega_{mrf}$ is the modified normalized right front wheel speed determined at block 176, $\omega_{nlr}$ is the normalized left rear wheel speed determined at block 174 and $\omega_{nrr}$ is the normalized right rear wheel speed determined at block 174. The value DELTA is the wheel speed difference between the front and rear wheels, reduced by the set-off factors determined for the front wheels. The set-off has the effect of allowing greater slip during low vehicle deceleration and low wheel deceleration conditions when the vehicle is steered straight. The result, as described herein, allows transfer of greater braking torque to the drive wheels to increase energy recovery through regenerative braking.

The value DELTA is then provided to the proportional-integral control block 406, which performs the function:

$$G = P*DELTA + I*(INT),$$

where G is the output of block 406, P is the proportional gain, for example 1.172 (the units are (% G/MPH), I is the integral gain, for example, 1.175 (the units are (% G/(MPH*sec.)) and INT is updated each control loop according to:

$$INT = DELTA*(Ts) + INT,$$

where Ts is the time between updates of DELTA, for example, the loop time of the control routine.

The output of the PI block 406 is then limited by the saturator block 408 to a minimum of 0.75 and a maximum of 4. The output of the saturator block 408 is a gain term multiplied by the open-loop rear torque command determined at block 402 to provide the adjusted rear brake torque command output from block 410, which is provided by block 154 to blocks 155 and 157 (FIG. 2).

Block 155 determines the rear actuator command as a function of the adjusted rear brake torque command and applies the rear brake actuator command to the rear drum brakes 158 to achieve rear wheel braking torque represented by line 160.

Block 157 determines the front brake torque command as the difference between the brake torque command and the adjusted rear brake torque command and provides the front brake torque command via line 60 to the motor control system 132. Block 140 determines the front friction torque command as a difference between the front brake torque command and torque achieved signal on line 62, which is the amount of brake torque accounted for in summation block 140, when the acceleration torque command and the front brake torque command are summed, and accounted for via regenerative braking, as indicated on line 135 (open loop implementation) or line 137 (closed loop implementation).

Block 143 determines the front actuator commands as a function of the front friction torque command and operates the front disc brakes 146 responsive to the front actuator command to achieve the desired amount of friction braking (if any). The summation of the front disc brakes and regenerative braking is represented by summation block 148 and resultant summation line 150 indicates the torque, either drive or brake, on the front wheels of the vehicle.

In the event of an anti-lock braking condition, brake control 134 implements controls according to known anti-lock braking techniques to achieve anti-lock braking. See, for example, above mentioned U.S. Pat. Nos. 4,850,650 and Re. 33,663. While the above control description is described in general and is not limited to the apparatus shown in FIG. 1, the apparatus shown in FIG. 1 is the preferred implementation thereof.

Figure 5:
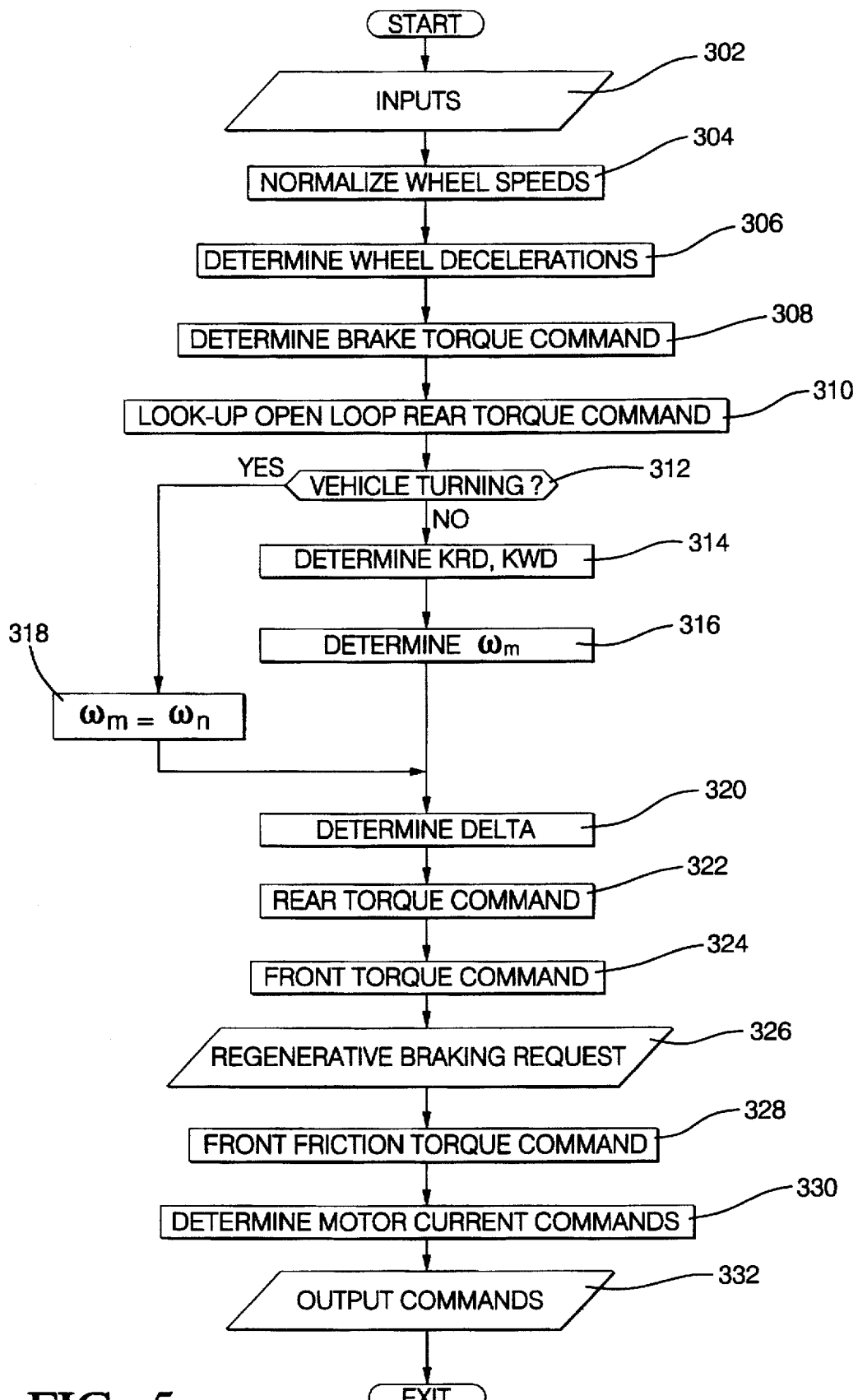
FIG. 5 illustrates an example flow diagram of a computer implementation of this invention into a brake controller.

Referring now to FIG. 5, the example computer flow diagram for the brake controller 66 starts and moves to block 302 where it receives the various system inputs, including the brake pedal command, the wheel speed commands and the regenerative braking information from the motor controller 22. At block 304 the routine normalizes the wheel speeds in the manner described in the above-mentioned application Ser. No. 08/513,192, now U.S. Pat. No. 5,646,848. At block 306, the routine determines the deceleration of each of the driven wheels, for example, as the difference in normalized wheel speeds of each wheel over a predetermined time period.

At block 308, the routine determines the brake torque command in response to the brake pedal input, i.e., from a look-up table or other conversion function. Block 310 implements a standard front to rear function, for example, through a look-up table with the input as the total brake torque requested and the output as the open-loop rear brake torque command. At block 312, the routine determines if the vehicle is turning and, if so, moves to block 318, where it sets the modified normalized wheel speeds for each driven wheel equal to the normalized wheel speed for that wheel. If at block 312, the vehicle is not turning, the routine continues to blocks 314 and 316 where it determines the coefficients Krd and Kwd (i.e., blocks 206 and 208, FIG. 3) and uses them to determine the set-off values and modified normalized wheel speeds for the driven wheels in the manner described above with reference to FIG. 3.

At block 320, the routine determines the value DELTA, in the manner described above with reference to block 404 (FIG. 4) and at block 322 the adjusted rear brake torque command is determined as described above with reference to FIG. 4.

Block 324 determines the front brake torque command as the difference between the brake torque command and the adjusted rear brake torque command. Block 326 sends the front brake torque command to the motor controller and receives the amount of regenerative braking achieved thereby.

At block 328, the front friction brake torque command is determined as the difference between the front brake torque command and the amount of regenerative braking achieved. At block 330, the controller determines in a known manner the motor commands for the brake actuators and, at block 332, outputs those commands to control the actuators in a known manner to achieved the desired brake torques.

Through the control described above, regenerative braking is achieved that shifts, vehicle conditions of low brake torque request, low drive wheel deceleration and no turning maneuvers, more of the brake load to the wheels connected to the electric motor so that the wheels can use regenerative braking to carry more of the braking load.

While the system shown in FIG. 1 is described as being a front wheel drive vehicle, this invention can also be implemented in rear wheel drive electric or hybrid vehicles. In rear wheel drive vehicles, the regenerative braking is carried out through the rear wheels and the brake torque is shifted to the rear wheels to increase the efficiency of energy recovery during regenerative braking. The benefits of shifting the brake torque from ideal to non-ideal in a rear wheel drive vehicle are illustrated by FIGS. 6 and 7.

Figure 6:
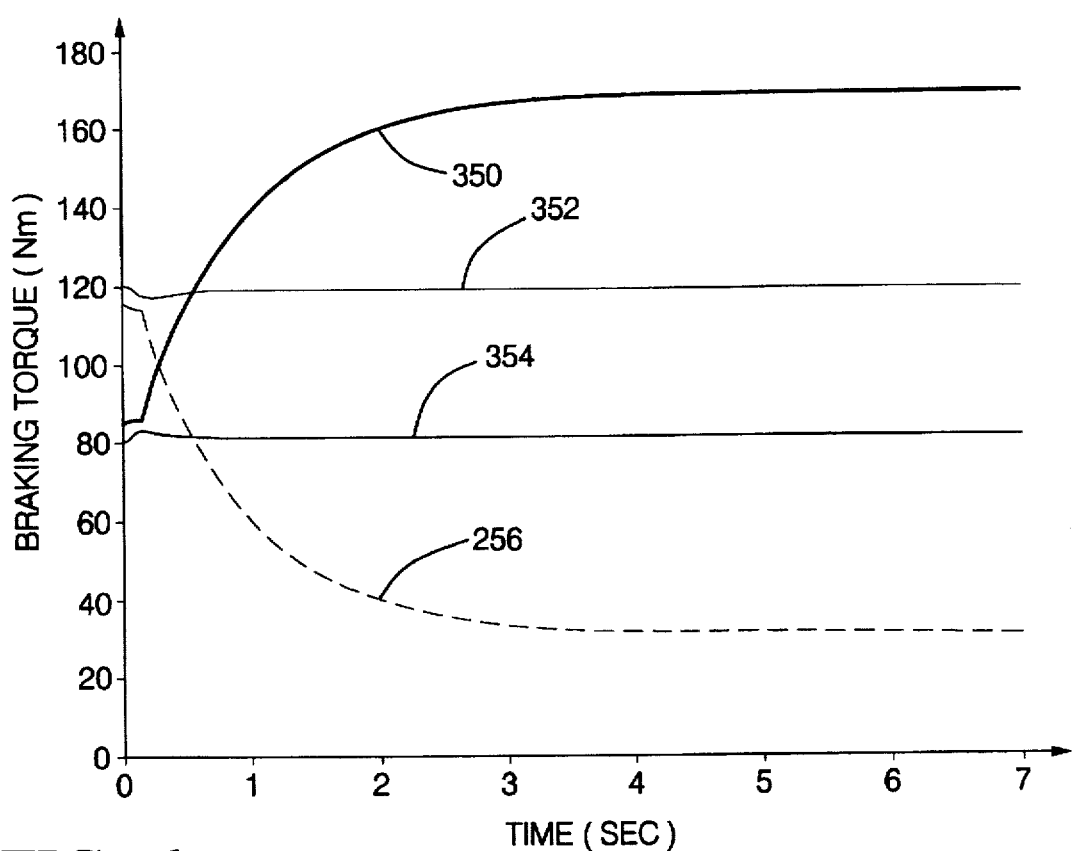
FIGS. 6 and 7 illustrate example simulation results according to this invention.

In FIG. 6, traces 352 and 354 represent the front and rear ideal brake torques, respectively, for an example vehicle decelerating at 0.7 m/s$^2$ on a dry surface. Traces 356 and 350 illustrate the front and rear brake torques when this invention is implemented to shift the braking to the rear wheels, which are coupled to the electric drive motor. As can be seen, more of the brake load is picked up by the wheels capable of providing regenerative braking while the total brake torque for the vehicle remains constant. The shift of brake torque to the rear (driven) wheels represents opportunity for increased usage of regenerative braking, increasing energy recovery during braking and improving the overall efficiency of the vehicle.

Figure 7:
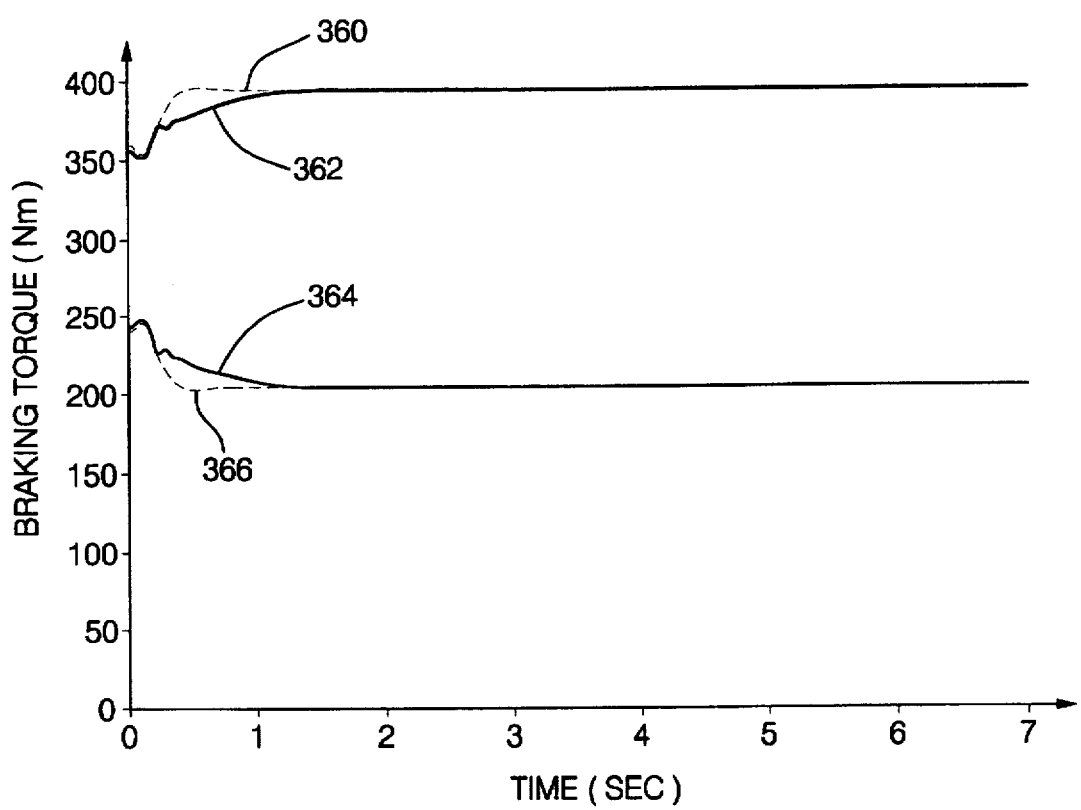

FIG. 7 illustrates the same vehicle under harder braking conditions, decelerating at 2.4 m/s$^2$ on a dry surface. Traces 360 and 366 show the ideal front and rear brake torques, respectively, and traces 3362 and 364 show the non-ideal front and rear brake torques when the wheel speeds use the set-offs described above. In this higher deceleration example, there is little deviation from the ideal front to rear brake proportioning and the deviation that does occur quickly reduces to zero. This illustrates the operating of the function blocks 206, 208 (FIG. 3) to reduce the set-off coefficients Krd and Kwd to zero during higher decelerations, smoothly returning the vehicle to ideal front-to-rear brake proportioning.

We claim:

1. In a vehicle with a first set of first and second wheels coupled to an electric drive system capable of providing regenerative braking and a second set of third and fourth wheels, wherein the vehicle dynamically adjusts a brake proportioning between the first and second sets responsive to a determined wheel speed difference between the first and second sets, the improvement comprising a regenerative braking control method according to the steps of:

measuring first, second, third and fourth speeds of the first, second, third and fourth wheels;

normalizing the first, second, third and fourth speeds;

for each wheel of one of the first and second sets, determining a wheel speed set-off value inversely relational to a commanded brake torque and a wheel deceleration;

determining modified normalized wheel speeds for each wheel of said one of the first and second sets responsive to the normalized wheel speeds and the wheel-speed set-off values; and determining the wheel speed difference between the first and second sets responsive to the modified normalized wheels speeds of said one of the first and second sets and the normalized wheel speeds of the other of the first and second sets, wherein the dynamic adjusting of brake proportioning between the first and second sets responsive to the determined wheel speed difference is responsive to the speed set-off values to increase brake torque load on the first and second wheels, increasing an amount of braking achieved regeneratively.

2. In a vehicle with a first set of first and second wheels coupled to an electric drive system capable of providing regenerative braking and a second set of third and fourth wheels, wherein the vehicle dynamically adjusts a brake proportioning between the first and second sets responsive to a determined wheel speed difference between the first and second sets, the improvement comprising a regenerative braking control method according to the steps of:

measuring first, second, third and fourth speeds of the first, second, third and fourth wheels;

for each wheel of one of the first and second sets, determining a wheel speed set-off value inversely relational to a commanded brake torque and a wheel deceleration;

determining modified wheel speeds for each wheel of said one of the first and second sets responsive to the wheel speeds and the wheel speed set-off values; and determining the wheel speed difference between the first and second sets responsive to the modified wheels speeds of said one of the first and second sets and the wheel speeds of the other of the first and second sets, wherein the dynamic adjusting of brake proportioning between the first and second sets responsive to the determined wheel speed difference is responsive to the wheel speed set-off values to increase brake torque load on the first and second wheels, increasing an amount of braking achieved regeneratively.

3. A regenerative braking control method according to claim 2 wherein the first, second, third and fourth wheel speeds are normalized.

* * * * *